United States Patent Office 3,489,515
Patented Jan. 13, 1970

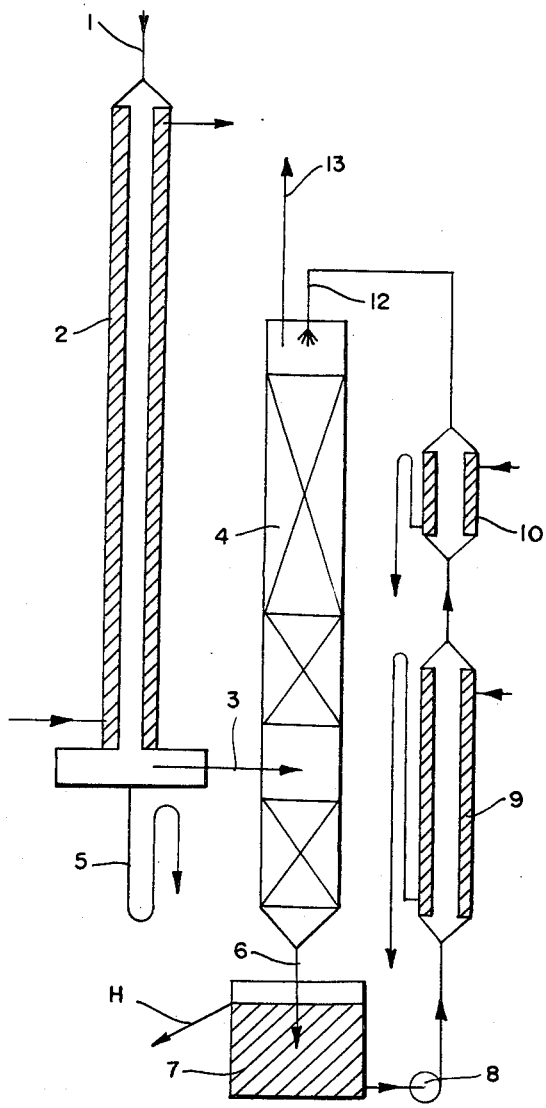

3,489,515
PRODUCTION OF HIGH PERCENTAGE NITRIC OXIDE
Kurt Jockers, Kurt Krauss, and Heinz Theobald, Ludwigshafen (Rhine), Germany, assignors to Badische Anilin- & Soda-Fabrik Aktiengesellschaft, Ludwigshafen (Rhine), Germany
Filed Dec. 23, 1965, Ser. No. 515,896
Claims priority, application Germany, Dec. 29, 1964, B 79,926
Int. Cl. C01b 21/26
U.S. Cl. 23—160
3 Claims

ABSTRACT OF THE DISCLOSURE

A process for obtaining a product gas of high percentage nitric oxide (NO) by removing water and nitrogen dioxide ($NO_2$) from the off-gas obtained in the combustion of ammonia, wherein the off-gas is cooled in a first stage by indirect cooling to 80° to 90° C., a nitric acid having a concentration of less than 1% by weight being obtained in this way, and in a second stage by direct cooling with recycle nitric acid having a concentration of at least 15% by weight in order to remove the residual water content and nitrogen dioxide.

---

The present invention relates to a process for the production of high percentage nitric oxide (NO) and relates particularly to the removal of nitrogen dioxide ($NO_2$) and water from the reaction gas obtained by reacting ammonia with oxygen.

It is known that ammonia may be burnt with oxygen in contact with a catalyst containing platinum for the production of high percentage nitric oxide, steam being added to the gas mixture as a diluent. The reaction takes place at a temperature of 850° to 900° C. According to the equation:

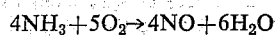

$$4NH_3 + 5O_2 \rightarrow 4NO + 6H_2O$$

1.25 liters of oxygen is required for each liter of ammonia. In order to obtain good combustion yields in contact with the catalyst, however, about 1.28 to 1.40 liters of oxygen is used. After the reaction gas has left the catalyst chamber, it contains not only nitric oxide, steam and small amounts of nitrogen and nitrous oxide ($N_2O$), but also oxygen. When the gas is cooled and the steam condensed, nitrogen dioxide is formed and reacts with the condensed water and yields a dilute acid which contains about 2 to 4% of nitric acid ($HNO_3$) and about 1 to 2% of nitrous acid ($HNO_2$).

This dilute acid constitutes a troublesome, inevitable by-product. It may be used as the absorption liquid in a nitric acid absorption plant, but impairs a satisfactory absorption of the gases containing oxides of nitrogen. When such a plant is not available, the acid cannot be used in an economical manner owing to its low concentration.

It is an object of the present invention to provide a process for the production of high percentage nitric oxide by oxidation of ammonia with oxygen wherein these disadvantages are avoided. It is a particular object of the present invention to provide a process for the removal of nitrogen dioxide and water from high percentage nitric oxide prepared by catalytic oxidation of ammonia in the presence of steam wherein a high percentage of the nitrogen dioxide is converted to a nitric acid having a concentration of at least 15% by weight which may be used for several purposes without further concentration.

These advantages are achieved by condensing the bulk of the steam from the hot reaction gas in a first stage by indirect cooling to temperatures of 80° to 90° C. while recovering a nitric acid having a concentration of less than 1% by weight, and removing the remainder of the water and also the nitrogen dioxide contained in the reaction gas in a second stage by direct cooling with nitric acid having a concentration of at least 15% by weight, preferably 18 to 21% by weight, said nitric acid being withdrawn from the bottom of the second stage with removal of the nitric oxide formed as a purified off-gas from the top of this second stage. The withdrawn nitric acid is then cooled and recycled to the top of the second stage.

The very dilute acid formed in the first stage, which as a rule has a concentration of 0.3 to 0.5% by weight, may be used without difficulty in an absorption tower as the absorption liquid for the production of nitric acid. It may however be discarded owing to its low concentration. The stronger acid obtained in a relatively small amount in the second stage and not required as recycle acid may be used for any suitable purpose.

The gas leaving the combustion apparatus at a temperature of about 130° to 150° C., is freed from the bulk, about 70 to 85% by weight of the total content, of the steam contained therein in an indirect cooler. The condensation is carried out so that only a small amount of the nitrogen dioxide is absorbed by the liquid which separates out. This is achieved according to this invention by cooling the gas to temperatures of 80° to 90° C. At a higher off-gas temperature, too little steam is condensed, while at a lower off-gas temperature the acid concentration rises. It is also advantageous to choose the highest possible gas loading of the cooler, or in other words to keep the residence time of the gas in the cooler as short as possible.

In the second stage, the remainder of the water content and also the nitrogen dioxide should be removed as completely as possible from the reaction gas, the condensed water and the nitrogen dioxide reacting to form nitric acid. For this purpose use is made according to this invention of a direct cooler operated with nitric acid which is formed and recycled and which has a concentration of at least 15% by weight. Preferably the acid used has a concentration of 18 to 21% by weight. Heat of condensation of the steam is carried off by cooling the recycle acid.

The gas having a temperature of 80° to 90° C. is passed into the lower portion of a direct cooler. The recycle acid in this portion is thus heated strongly so that the formation of nitric acid from the nitrogen dioxide dissolved in the upper colder portion of the direct cooler is carried to completion and the nitric oxide thus formed is expelled from the acid.

The temperature of the off-gas determines the $NO_2$ content thereof, and the temperature of the off-gas is in turn determined by the temperature of the inflowing recycle acid. These relationships are indicated in the following Table 1:

TABLE 1

| Temperature in ° C. of the inflowing acid | Temperature in ° C. of the off-gas | $NO_2$ content in percent by volume of the off-gas |
|---|---|---|
| 42 | 45 | 1 |
| 29 | 32 | 0.8 |
| 17 | 19 | 0.2 |
| 13 | 15 | 0.1 |

The recycle acid may be cooled to about 30° C. by means of cooling water having a temperature of about 25° C. The off-gas leaving the cooler then has a temperature of about 32° C. At this temperature it contains about 0.8% by volume of nitrogen dioxide, which may be regarded as satisfactory. It is also possible to cool the acid to about 20° C. in a further cooler by means of cooling brine, so that the gas has a content of nitrogen dioxide of about 0.2% by volume. This cooling with brine may also be carried out in a second separate acid circulation system in the upper portion of the tower itself.

The accompanying drawing shows diagrammatically and by way of example a plant for carrying out the process according to this invention.

The reaction gas having a temperature of about 130° C. is introduced through line 1 into an indirect cooler 2 which is cooled with water. The gas, cooled to 80° to 90° C., then passes through line 3 into a direct cooler and absorber 4, while the dilute acid formed at the same time is withdrawn from the system through line 5. The upper portion of the cooler 4 is charged with cooled recycled acid obtained from the bottom of the direct cooler 4 at container 7 and passed through coolers 9 and 10 and introduced back into the top of direct cooler 4 through line 12. The acid formed is withdrawn through line 6 into a container 7 whence it is introduced by a pump 8 into a cooler 9 operated with water. If desired, the acid may be further cooled with cooling brine in a cooler 10, and it is then passed through line 12 into the direct cooler 4. The product acid may be withdrawn through line 11 from the container 7 at a rate equivalent to the rate of formation. Purified reaction off-gas containing the desired nitric oxide (NO) is removed through line 13.

The following example will further illustrate the invention.

EXAMPLE

A gas which contains 14% by volume of ammonia, 19.20% by volume of oxygen, the remainder being steam is burned in contact with a platinum-rhodium catalyst. The gas leaves the reaction apparatus at a temperature of 137° C. after it has already given off the bulk of its heat of reaction for the production of steam. 22 cubic meters (STP) per hour of this gas is passed into the cooler 2 shown in the drawing. This cooler has an exchange surface of 1000 sq. cm. The gas is introduced at a temperature of 92° C. into the direct cooler 4. 13 to 14 liters per hour of dilute nitric acid having a content of about 0.3% by weight of $HNO_3$ and 0.1% by weight of $HNO_2$ and a temperature of 92° C. is withdrawn from the cooler 2. The inlet temperature of the cooling water is about 31° C. On leaving the cooler, the cooling water has a temperature of 41° C. With reference to the amount of gas entering, the residence time of the gas in the cooler is only about 0.02 second. The $k$-value (coefficient of heat transfer) of the cooler is thus about $$1000 \frac{\text{kcal.}}{\text{h./sq.m./°C.}}$$

A packed scrubbing tower having a volume of about 5 liters is used as the second cooler. It is charged with about 50 liters per hour of recycle acid which is cooled in a cooler 9 operated with water. 3 liters per hour of nitric acid having a concentration of 18 to 20% of $HNO_3$ is withdrawn from this scrubber. The content of nitrogen dioxide in the gas withdrawn at 12 depends on its temperature or on the temperature of the recycle acid. The following Table 2 gives the details for two parallel experiments.

TABLE 2

| Cooler 2: | | |
|---|---|---|
| Gas inlet temperature, ° C | 137 | 137 |
| Gas outlet temperature, ° C | 92 | 92 |
| Amount of gas | 22 cubic meters (STP)/h. | |
| Water inlet temperature, ° C | 31 | 32 |
| Water outlet temperature, ° C | 41 | 43 |
| Amount of water | 870 liters per hour | |
| Condensate temperature, ° C | 92 | 92 |
| Amount of condensate, l./h | 13.5 | 14.0 |
| Analysis of condensate: | | |
| Percent $HNO_3$ | 0.25 | 0.14 |
| Percent $HNO_2$ | 0.07 | 0.07 |
| Cooler 4: | | |
| Gas inlet temperature, ° C | 92 | 92 |
| Gas outlet temperature, ° C | 30 | 31 |
| Percent volume of $NO_2$ in off-gas | 0.8 | 0.8 |
| Acid supply temperatures ° C | 27 | 28 |
| Outlet temperature of acid, ° C | 85 | 87 |
| Amount of recycle acid | 50 liters per hour | |
| Amount of condensate, l./h | 3.9 | 4.0 |
| Analysis of condensate: | | |
| $HNO_3$, percent | 20.05 | 19.34 |
| $HNO_2$, percent | 0.30 | 0.23 |

We claim:
1. A process for the removal of steam and nitrogen dioxide from high percentage nitric oxide prepared by catalytic oxidation of ammonia with oxygen in the presence of steam, the ratio by volume of ammonia to oxygen being from 1:1.28 to 1:1.40, said process comprising: condensing the bulk of the steam contained in said high percentage nitric oxide in a first stage by indirect cooling of said gases to temperatures of 80° to 90° C. while recovering a nitric acid having a concentration of less than 1% by weight from said first stage; introducing the off-gas from the first stage into the lower portion of a second stage to remove the remainder of the water and nitrogen dioxide contained in said off-gas from the first stage by cooling in said second stage the off-gas in direct contact and countercurrently with nitric acid having a concentration of at least 15% by weight; removing practically pure nitrogen oxide from the upper portion of said second stage and drawing off the treated acid from the lower portion of said second stage; cooling said acid drawn off from the lower portion of said second stage and recycling it as cooling acid into the upper portion of said second stage.

2. A process according to claim 1, wherein the treated nitric acid drawn off from the lower portion of said second stage is cooled down to a temperature below about 30° C.

3. A process according to claim 1, wherein the recycled acid has a concentration of 18 to 21% by weight.

References Cited

UNITED STATES PATENTS

| 1,735,342 | 11/1929 | Taylor et al. | 23—162 |
| 1,989,267 | 1/1935 | Caro et al. | 23—162 XR |
| 2,132,663 | 10/1938 | Voogel | 23—160 |
| 3,110,563 | 11/1963 | Krauss | 23—162 |

FOREIGN PATENTS

| 752,321 | 5/1953 | Germany. |
| 1,073,455 | 1/1960 | Germany. |

OSCAR R. VERTIZ, Primary Examiner

G. O. PETERS, Assistant Examiner

U.S. Cl. X.R.

23—162